(12) United States Patent
Liang et al.

(10) Patent No.: US 11,469,547 B2
(45) Date of Patent: Oct. 11, 2022

(54) ROTARY COUPLING STRUCTURE, POWER SUPPLY DEVICE AND SOFA

(71) Applicant: Huizhou Zhongbang Electronics Co., Ltd, Huizhou (CN)

(72) Inventors: Dexin Liang, Huizhou (CN); Qiping Xiang, Huizhou (CN)

(73) Assignee: HUIZHOU ZHONGBANG ELECTRONICS CO., LTD, Huizhou (CN)

( * ) Notice: Subject to any disclaimer, the term of this patent is extended or adjusted under 35 U.S.C. 154(b) by 328 days.

(21) Appl. No.: 16/741,787

(22) Filed: Jan. 14, 2020

(65) Prior Publication Data
US 2021/0098935 A1 Apr. 1, 2021

(51) Int. Cl.
*H01M 50/20* (2021.01)
*H01R 13/625* (2006.01)
*A47C 17/86* (2006.01)
*H01R 13/66* (2006.01)

(52) U.S. Cl.
CPC ........... *H01R 13/625* (2013.01); *A47C 17/86* (2013.01); *H01M 50/20* (2021.01); *H01R 13/6675* (2013.01); *H01M 2220/10* (2013.01)

(58) Field of Classification Search
CPC .. H01R 13/625; H01R 13/6675; H01R 13/58; H01R 13/6271–6273; H01M 50/20; H01M 2220/10; A47C 17/86
USPC ........................................................ 439/332
See application file for complete search history.

(56) References Cited

U.S. PATENT DOCUMENTS

| | | | | |
|---|---|---|---|---|
| 3,912,355 A * | 10/1975 | Curado | .................. | F21V 19/006 439/546 |
| 4,029,953 A * | 6/1977 | Natoli | ...................... | B60Q 3/14 439/546 |
| 4,373,771 A * | 2/1983 | Cross | ..................... | H02B 1/044 439/549 |
| 5,375,046 A * | 12/1994 | Narumi | .................. | B60Q 1/007 362/549 |
| 5,879,186 A * | 3/1999 | Harada | .................. | F21S 41/194 439/549 |
| 5,984,721 A * | 11/1999 | Self, Jr. | .................. | H01R 13/74 439/546 |
| 7,357,669 B2 * | 4/2008 | Gabet | .................... | H01R 13/74 439/549 |
| 7,503,794 B2 * | 3/2009 | Haller | .................. | H01R 13/633 439/357 |
| 7,866,992 B2 * | 1/2011 | Pfeiffer | ................ | H01R 13/625 439/140 |
| 8,079,855 B2 * | 12/2011 | Pfeiffer | ................ | H01R 13/443 439/140 |
| 8,215,977 B2 * | 7/2012 | Zapf | .................... | H01R 13/625 439/352 |
| 8,500,486 B2 * | 8/2013 | Buck | .................... | H01R 13/645 439/551 |

(Continued)

*Primary Examiner* — Harshad C Patel

(57) ABSTRACT

Described herein is a rotary coupling structure which comprises a fixing base and a rotary coupling plug; and the fixing base comprises a mounting member and a rotating member; the mounting member comprises a sleeve provided on the inner wall with a lock slot, a limit buckle disposed at the end of the sleeve, and a side boss disposed on the side wall of the sleeve; the rotary coupling plug, configured to be inserted into the sleeve and connected with a connector, is provided with a rotary lock blade rotatively disposed in the lock slot.

10 Claims, 11 Drawing Sheets

(56) References Cited

U.S. PATENT DOCUMENTS

| | | | |
|---|---|---|---|
| 9,054,452 B2* | 6/2015 | Yamada | H01R 13/625 |
| 9,059,538 B2* | 6/2015 | Showcatally | H01R 13/5208 |
| 9,065,187 B2* | 6/2015 | Leshniak | H01K 5/00 |
| 9,614,307 B2* | 4/2017 | Fan | H01R 12/7076 |
| 11,050,192 B2* | 6/2021 | Qiu | H01R 13/639 |
| 11,121,490 B1* | 9/2021 | Fu | H05K 7/142 |

* cited by examiner

ROTARY COUPLING STRUCTURE, POWER SUPPLY DEVICE AND SOFA

CROSS-REFERENCE TO RELATED APPLICATION

Benefit is claimed to Chinese Patent Application No. 201910936736.2, filed Sep. 29, 2019, the contents of which are incorporated by reference herein in their entirety.

FIELD OF THE INVENTION

The present invention relates to the field of power supply devices, in particular to a rotary coupling structure, a power supply device and a sofa.

BACKGROUND OF THE INVENTION

In some electric products, such as smart home appliances, automotive electronics, or other electronic and electrical products, power supply devices are used, especially in electric sofas. When the electric product needs power, the power supply device can be sleeved in the power input interface of the electric product, so that the function of the electric product itself can be realized.

However, in the existing electric product, the plug of the power supply device is usually directly inserted into the power input interface of the electric product. By such a connection method, the plug of the power supply device cannot be firmly installed in the power input interface of the electric product on the one hand, and the existing power supply device is not convenient to be installed on and disassembled from the electric product on the other hand, which increases the difficulty of assembly and disassembly and thus reduces the production efficiency.

SUMMARY

In order to overcome the deficiencies in the prior art, a purpose of the present invention is to provide a rotary coupling structure, a power supply device and a sofa, which can firmly install the power supply device in the power input interface of electric products so as to improve the stability of the mutual electrical connection on the one hand, and can facilitate disassembly, installation and assembly and improve production efficiency on the other hand.

The purpose of the present invention is achieved through the following technical solution:

A rotary coupling structure is provided, comprising:

a fixing base including a mounting member and a rotating member; the mounting member comprises a sleeve provided on the inner wall with a lock slot, a limit buckle disposed at the end of the sleeve, and a side boss disposed on the side wall of the sleeve; the rotating member comprises a rotary cap and a connector disposed in the rotary cap; the rotary cap, sleeved together with the sleeve, has an arc slot at its end and a rotation slot on its side wall, and is provided with a bayonet at both ends of the rotation slot, respectively; the limit buckle is rotatively disposed in the arc slot; the side boss, rotatively disposed in the rotation slot, can also be locked in the bayonet; and a rotary coupling plug, configured to be inserted into the sleeve and connected with the connector, is provided with a rotary lock blade rotatively disposed in the lock slot.

In one of the examples, the rotary coupling plug is provided with a slot, and the connector is provided with a pin, which is configured to be inserted into the slot so that the rotary coupling plug is electrically connected to the connector; or the connector is provided with a slot, and the rotary coupling plug is provided with a pin, which is configured to be inserted into the slot so that the rotary coupling plug is electrically connected to the connector.

In one of the examples, the pin comprises at least two profiled pins; and the profiled pins are a square pillar pin and/or a cylindrical pin.

In one of the examples, the connector is provided with a slot, and the rotary coupling plug is provided with a pillar, which is configured to be embedded in the slot; or the rotary coupling plug is provided with a slot, and the connector is provided with a pillar, which is configured to be embedded in the slot.

In one of the examples, there are a plurality of the rotary lock blades and a plurality of the lock slots, the rotary lock blades rotatively arranged in the lock slots in a one-to-one correspondence.

In one of the examples, the rotary lock blades are specifically a plurality of profiled rotary lock blades.

In one of the examples, the sleeve is also provided on the inner wall with a slide-in slot, which is in communication with the lock slot, with the rotary lock blade configured to slide along the slide-in slot into the lock slot.

In one of the examples, one end of the arc slot is aligned with one of the bayonets, and the other end of the arc slot is aligned with the other bayonet.

The present invention further provides a power supply device, which comprises the rotary coupling structure according to any of the above, and further comprises a battery pack connected to the rotary coupling plug.

The present invention further provides a sofa, which comprises the power supply device as described above, and further comprises a sofa body, on which the fixing base is installed, the rotary coupling plug connected with the battery pack being configured to be inserted into the fixing base.

The present invention has the following advantages and beneficial effects compared to the prior art:

The present invention provides a rotary coupling structure, a power supply device and a sofa, and makes the rotary coupling plug in the rotary coupling structure rotatively disposed on the fixing base; in this way, the present invention can firmly install the power supply device in the power input interface of electric products, so as to improve the stability of the mutual electrical connection on the one hand, and can facilitate disassembly, installation and assembly and improve production efficiency on the other hand.

BRIEF DESCRIPTION OF THE DRAWINGS

In order to illustrate the technical solutions of the examples of the present invention more clearly, the drawings to be used in the examples will be briefly described below. It should be understood that the following drawings only show some examples of the present invention, and therefore should not be considered as limiting the scope. For those of ordinary skill in the art, other related drawings can also be obtained according to the drawings without any inventive work.

DETAILED DESCRIPTION OF THE EMBODIMENTS

In order to facilitate understanding of the present invention, the present invention will be described more fully hereinafter with reference to the accompanying drawings. The preferred embodiments of the present invention are given in the accompanying drawings. However, the present invention can be implemented in many different forms and is not limited to the embodiments described herein. Rather, the purpose of these embodiments is to provide a more thorough and comprehensive understanding of the disclosure of the present invention.

It should be noted that when an element is referred to as being "fixed to" another element, it may be directly on another element or there may be an element in between. When an element is considered to be "connected" to another element, it can be directly connected to another element or there may be an element in between. The terms "vertical", "horizontal", "left", "right" and similar expressions used herein are for illustration only, and do not mean that they are the only embodiments.

Unless otherwise defined, all the technical and scientific terms used herein have the same meaning as commonly understood by those skilled in the art to which the present invention belongs. The terms used in the description of the present invention herein are only for the purpose of describing the specific embodiments, and are not intended to limit the present invention. The term "and/or" as used herein includes any and all combinations of one or more of the associated listed items.

Figure 1:
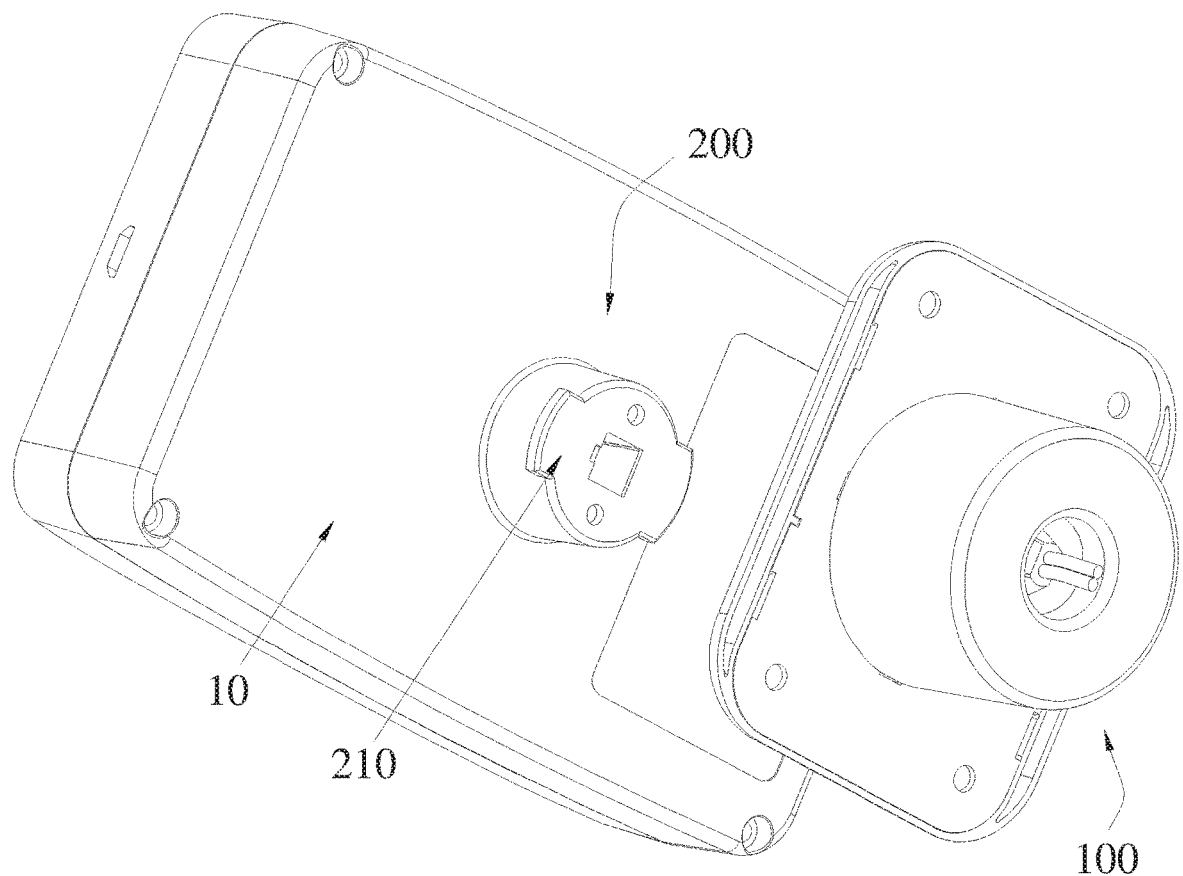
FIG. 1 is a structural schematic view of the rotary coupling structure according to an embodiment of the present invention.

As shown in FIG. 1, a rotary coupling structure comprises a fixing base 100 and a rotary coupling plug 200. It should be noted that the fixing base 100 is configured to install the rotary coupling plug 200, which is configured to be fixed on an external power supply device.

Figure 2:
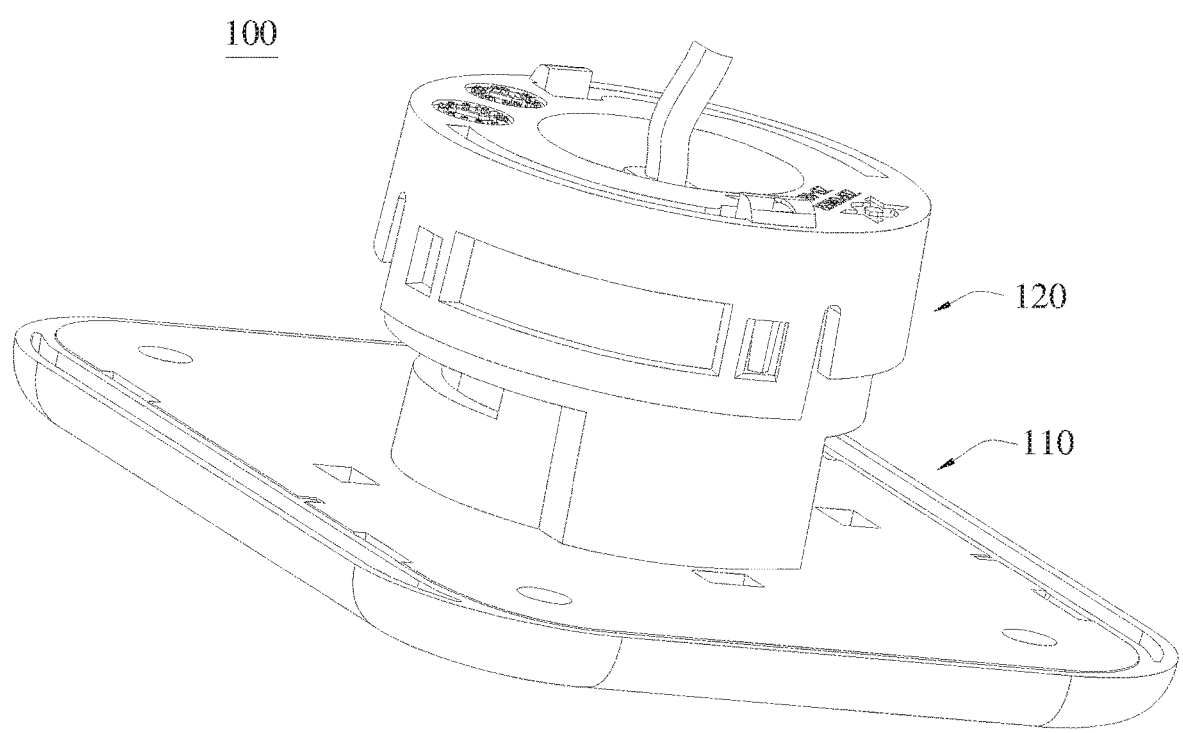
FIG. 2 is a structural schematic view of the fixing base shown in FIG. 1.

FIG. 2 shows a fixing base 100, particularly a fixing base mounted on a sofa. The fixing base 100 comprises a mounting member 110 and a rotating member 120. It should be noted that the mounting member 110 is configured to be fixed on an external product, such as smart home appliances, automobile electronics, or other electronic appliances. In the present invention, it is preferable that the mounting member 110 is fixed on a sofa, i.e. an electric sofa requiring electricity. The rotating member 120 is configured to be rotatively sleeved outside the mounting member 110. Specifically, the rotating member 120 can be sleeved on the mounting member 110 on the one hand, and can be configured to install or clamp the connecting wire on the other hand. More importantly, when an external power supply device needs to be installed, as long as the connecting wire is plugged to the external power supply device, the electrical connection to the product can be achieved.

In another example, the external power supply device goes through the mounting member 110 and then abuts against the rotating member 120, and it may also be electrically connected to the connecting wire. The power supply device, in order to be installed more firmly, can be rotated so as to get clamped by the mounting member 110. At the same time, the rotating member 120 abutting against the power supply device will also be driven to rotate, and then it will limit position together with the mounting member 110, so that the power supply device is fixed on the mounting member 110. The mounting member 110 and the rotating member 120 are engaged in a limit position to achieve double fixation, which makes the mounting member 110 and the rotating member 120 firmer and also the external power supply device firmer, improving the structural stability of the entire product.

Figure 3:
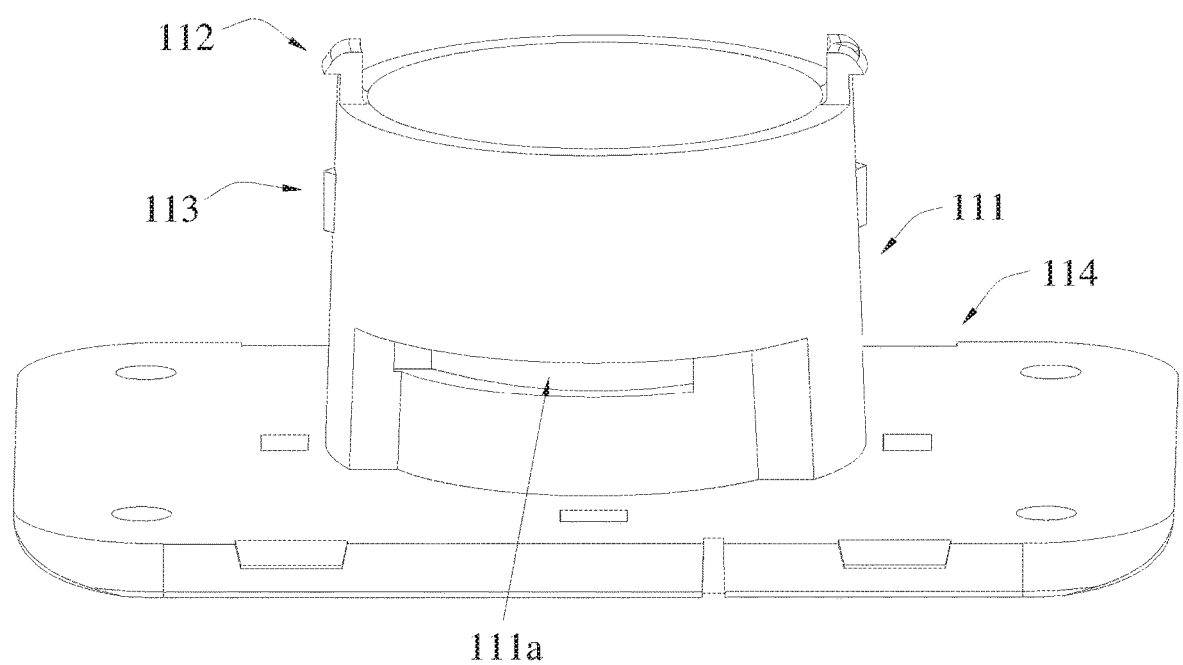
FIG. 3 is a structural schematic view of the mounting member of the fixing base shown in FIG. 2.

As shown in FIG. 3, the mounting member comprises a sleeve 111 provided on the inner wall with a lock slot 111a, a limit buckle 112 disposed at the end of the sleeve 111, and a side boss 113 disposed on the side wall of the sleeve 111.

It should be noted that the sleeve 111 is configured to connect the rotating member 120 and the external power supply device, and can also fix the limit buckle 112 and the side boss 113; the limit buckle 112 is configured to go through and be buckled on the rotating member 120, so that the rotating member 120 can only rotate across a certain range of angle without exceeding this range; the side boss 113 is configured to limit the rotating member 120 together with the limit buckle 112, further limiting the rotation angle and position of the rotating member 120. The lock slot 111a is configured to install the rotary coupling plug 200, playing a role of limiting and fixing.

Figure 4:
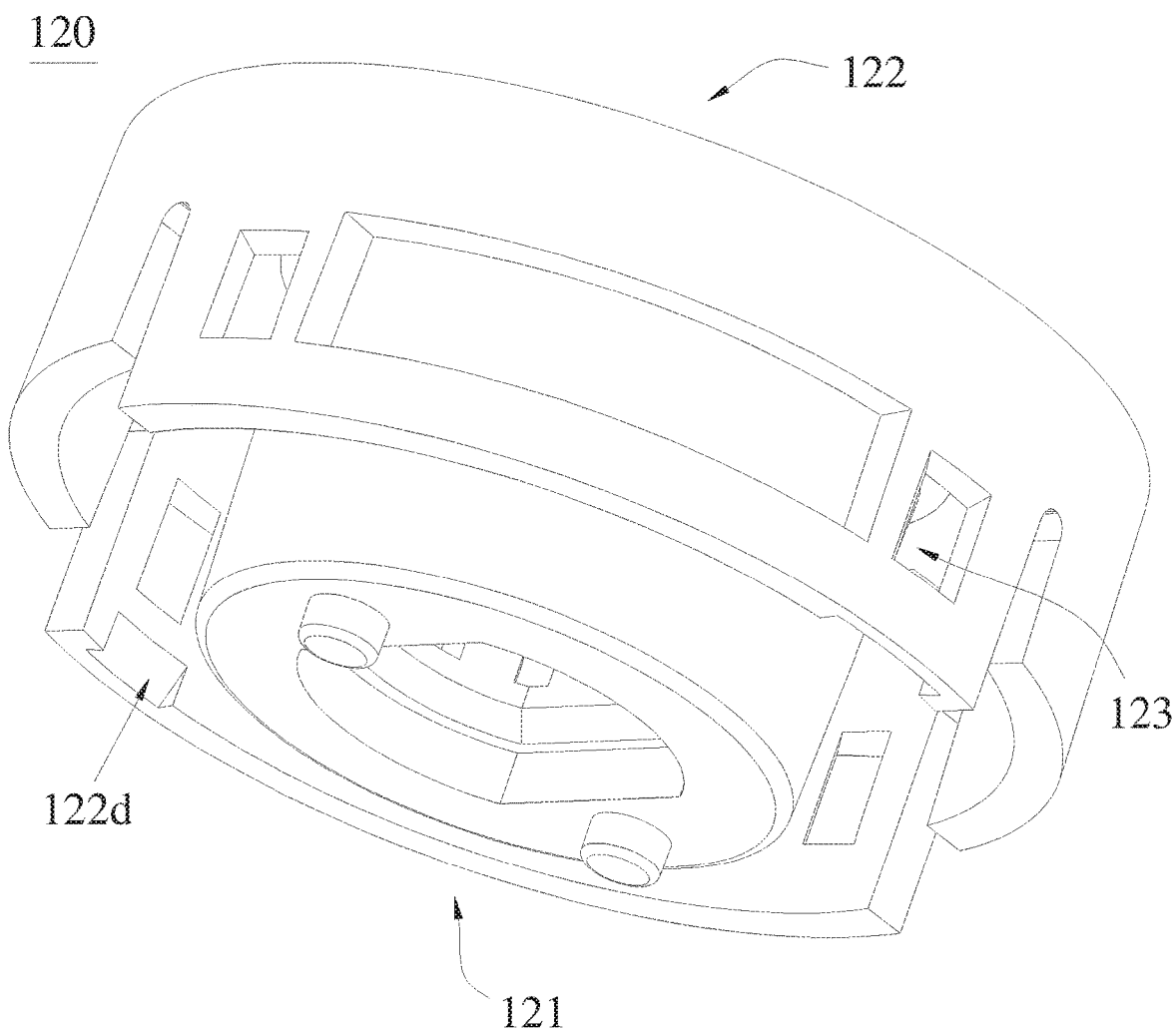
FIG. 4 is a structural schematic view of the rotating member of the fixing base shown in FIG. 2.
Figure 5:
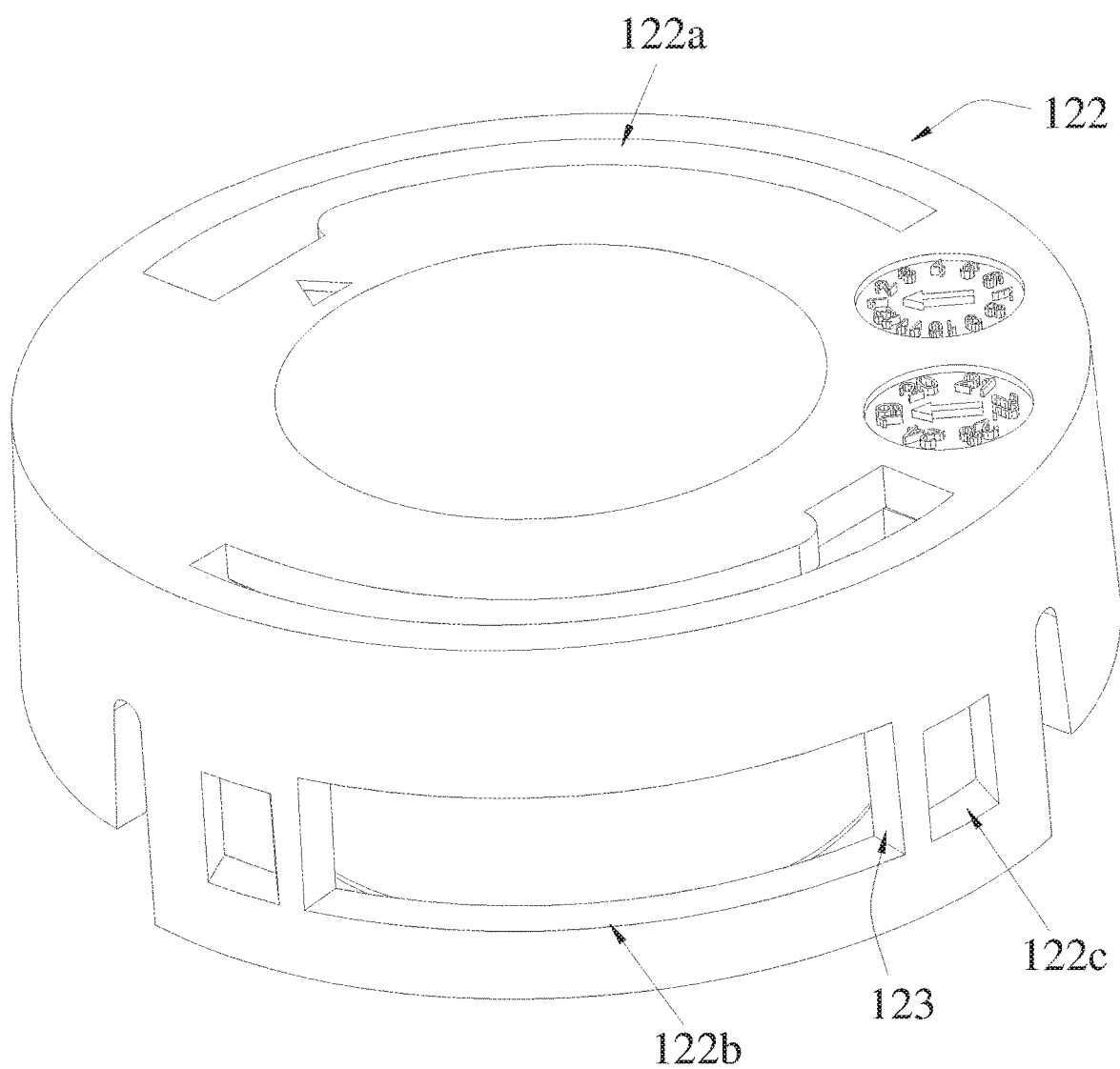
FIG. 5 is a structural schematic view of the rotating member shown in FIG. 4 from another perspective.

As shown in FIGS. 4 and 5, the rotating member 120 comprises a rotary cap 122 and a connector 121 disposed in the rotary cap 122; the rotary cap 122 has an arc slot 122a at its end and a rotation slot 122b on its side wall, and is provided with two bayonets 122c at both ends of the rotation slot 122b, respectively.

It should be noted that the connector 121 is configured to install an external wire; the rotary cap 122 is configured to be sleeved on the sleeve 111 to facilitate rotation on the sleeve 111. The arc slot 122a is configured to limit position together with the limit buckle 112, that is, the limit buckle 112 can only be rotated in the arc slot 122a, thereby preventing the structure of the rotary cap 122 from being damaged due to excessive rotation, thus improving the service life of the rotating member 120 and the stability of the entire fixing base; the rotation slot 122b is configured to limit the position of the side boss 113, so that the side boss 113 can also be rotated in the rotation slot 122b when the rotary cap 120 is rotated; the bayonet 122c is configured to fix the position of the side boss 113, that is, the two bayonets fix the position of the two side bosses 113, respectively; when the side boss 113 is rotated to one of the bayonets, it enters the final or initial position. On the one hand, this can give the user a sense of rotation, reminding the user that the rotation has reached a fixed position and can be stopped; on the other hand, this can limit the rotation angle and, together with the limit effect of the arc slot 122a and the limit buckle 112, can further prevent excessive rotation, thereby improving the stability of the entire fixing base.

Figure 6:
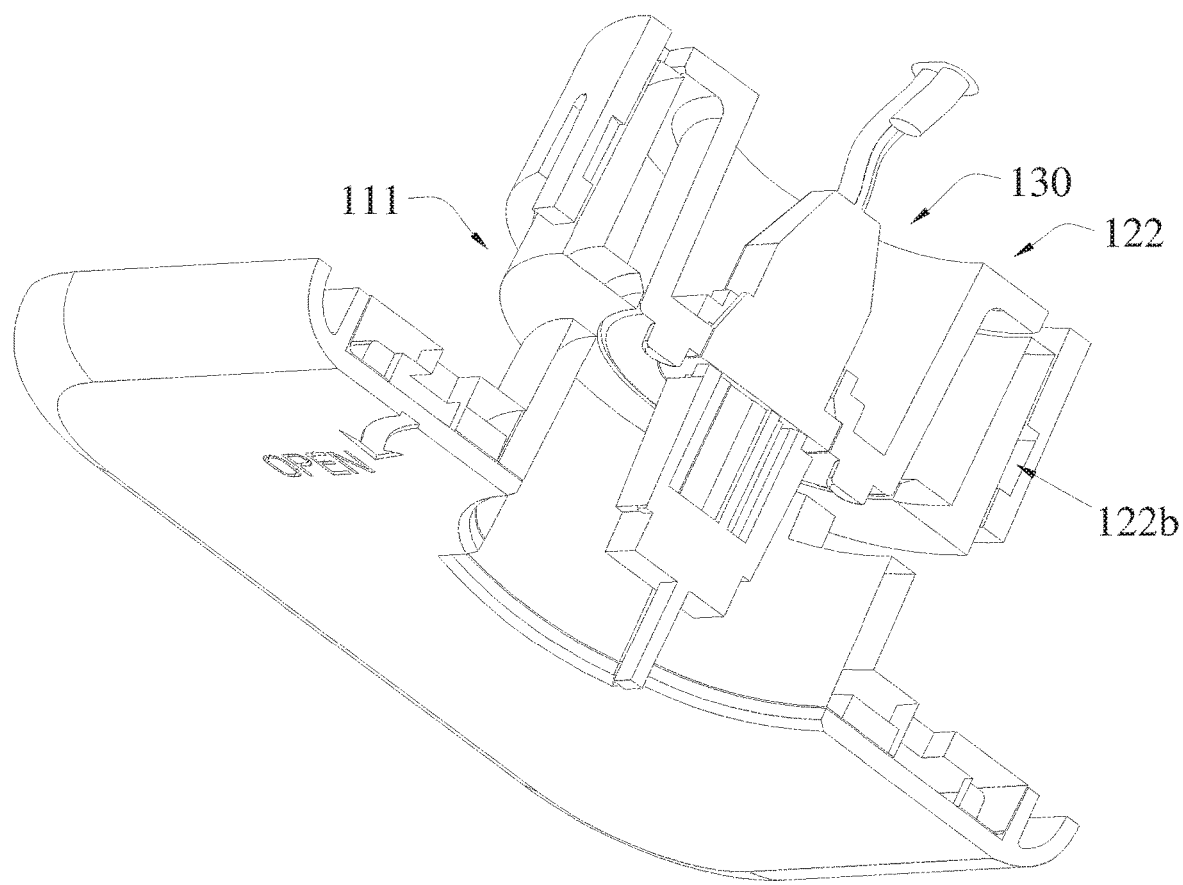
FIG. 6 is a schematic view of the inner structure of the fixing base shown in FIG. 2.

As shown in FIGS. 2 and 6, the rotary cap 122 is sleeved together with the sleeve 111; the limit buckle 112 is rotatively disposed in the arc slot 122a; the side boss 113, rotatively disposed in the rotation slot 122b, can also be locked in the bayonet 122a.

It should be noted that the rotary cap 122 is rotated on the sleeve 111 and limited by the limit buckle 112 and the arc slot 122a, ensuring that the rotary cap 122 can only rotate within a certain range of angle; the side boss 113 rotates in the rotation slot 122b, with its main function in that it can be snapped into the bayonet 122c at both ends of the rotation slot 122b; the side boss 113 rotating into the bayonet 122c indicates that the rotary cap has been rotated to the maximum position and prompts the user to stop the rotation, thereby ensuring the safety of the rotary cap and preventing the rotary cap from being damaged due to excessive rotation. The limit effect of the combined limit buckle 112 and arc slot 122a can ensure no more rotation, further improving the safety and reliability of the rotary cap.

It needs to be further explained that the two bayonets 122c, respectively provided at both sides of the rotation slot 122b, are respectively the starting end and the terminal end when the mounting member 110 rotates. This also indicates that only one of the side bosses can be locked by the bayonet, and the other one can be the starting or terminal end. That is, the two bayonets 122c limit the rotation angle and range of the side boss 113, so that the fixing base can be prevented from being damaged due to excessive rotation, thus improving the structural stability and safety of the fixing base. In addition, the arc slot starts from the bayonet in the same position; when the rotation is performed, since the limit buckle 112 is limited to rotate in the arc slot, the rotation angle of the mounting member and the rotating member can be further limited, thereby ensuring the structural stability.

In this way, the arc slot 122a and the limit buckle 112 are set to cooperate for limiting, and the side boss 113 and the rotation slot 122b can also play a limiting role, thus ensuring that the rotary cap only rotate within a certain range of angle; moreover, by providing a structure in which the side boss 113 and the bayonet 122c are fixed to each other, the connection structure can be more reliable and stable; when the fixing base has a power supply device and an electric product for electrical connection, it can be ensured that the connection will not be in poor contact, so that the stability of the electrical connection with the electric product can be improved and the electric products can work normally.

As shown in FIGS. 2 and 3, there are a plurality of the limit buckles 112 and a plurality of the arc slots 122a, the limit buckles 112 rotatively arranged in the arc slots 122a in a one-to-one correspondence. In this way, the plurality of the limit buckles 112 in cooperation with the plurality of the arc slots 122a can further improve the reliability.

In this example, there are two limit buckles with different sizes, one larger and the other smaller; therefore, it is necessary to set different width for the rotation slot to ensure more stable rotation. By setting two limit buckles of different sizes, a certain foolproof effect can be achieved when the rotating member 120 is installed, so that the two limit buckles can be prevented from being misaligned when installed, thereby facilitating subsequent installation of structures and improving the efficiency of installation and assembly.

As shown in FIGS. 2 and 4, there are a plurality of the side bosses 113 and a plurality of the rotation slots 122b, and the number of the bayonets 122c is twice the number of the rotation slots 122b, the side bosses 113 rotatively arranged in the rotation slots 122b in a one-to-one correspondence. In this way, the plurality of the side bosses 113 respectively in cooperation with the plurality of the rotation slots 122b and the plurality of the bayonets 122c can further facilitate rotation and positioning fixation after rotation, further guarantee the safety of the rotary cap, and avoid excessive rotation.

In this example, there are two limit buckles 112 and two arc slots 122a, the two limit buckles 112 rotatively arranged in the two arc slots 122a in a one-to-one correspondence. In this way, the reliability of rotation and the limit effect can be effectively guaranteed, and the cost can be controlled at a lower level.

In this example, there are two side bosses 113, two rotation slots 122b and four bayonets 122c, the two side bosses 113 rotatively arranged in the two rotation slots 122b in a one-to-one correspondence. In this way, by providing two side bosses 113 and two rotation slots 122b, it is convenient to realize the entire rotation; in addition, by providing a bayonet, when the side boss 113 is turned into the bayonet, the hand feeling during rotation can be increased to facilitate the control of the rotation force.

It should be noted that the rotation angle of the limit buckle is 0-90 degrees; the rotation angle of the side boss is 0-90 degrees; when the side boss is locked in one of the bayonets, the rotation angle of the side boss is 0 degree; when the side boss is locked in the other bayonet, the rotation angle of the side boss is 90 degrees. In this way, setting a rotation angle of 0-90 degrees can be beneficial to control the rotation of the rotating member, so that the rotating member will not exceed the rotation range and can effectively achieve engagement and avoidance.

As shown in FIGS. 4 and. 5, the rotary cap 122 is provided between the rotation slot 122b and the bayonet 122c with a deformation portion 123, which is configured to deform when the side boss enters or leaves the bayonet. In this way, with the deformation portion 123 between the rotation slot 122b and the bayonet 122c, when the side boss 113 slides, it is easy to be subjected to the rotation force during rotation, so that a portion of the deformation portion 123 in contact with the side boss 113 has certain deformation. After the deformation, the side boss 113 can smoothly enter the bayonet 122c, and thereafter the position of the side boss 113 can be limited, i.e., the side boss 113 is prevented from rotating back, ensuring the structural stability of the entire fixing base. In addition, when the side boss 113 is squeezed over the outer surface of the deformation portion 123, there is a raised hand feeling during rotation, and then the user can change the rotation force; therefore, this hand feeling plays a certain role of identification for the user, and is convenient for controlling the rotation force.

As shown in FIG. 4, the rotary cap 122 is provided on the inner side wall with an avoidance slot 122d, and the side boss 113 is configured to slide along the avoidance slot 122d so as to slide into the bayonet 122c. In this way, by providing the avoidance slot 122d, the rotating member 120 can be easily installed, reducing the installation time and then improving the production efficiency.

Figure 7:
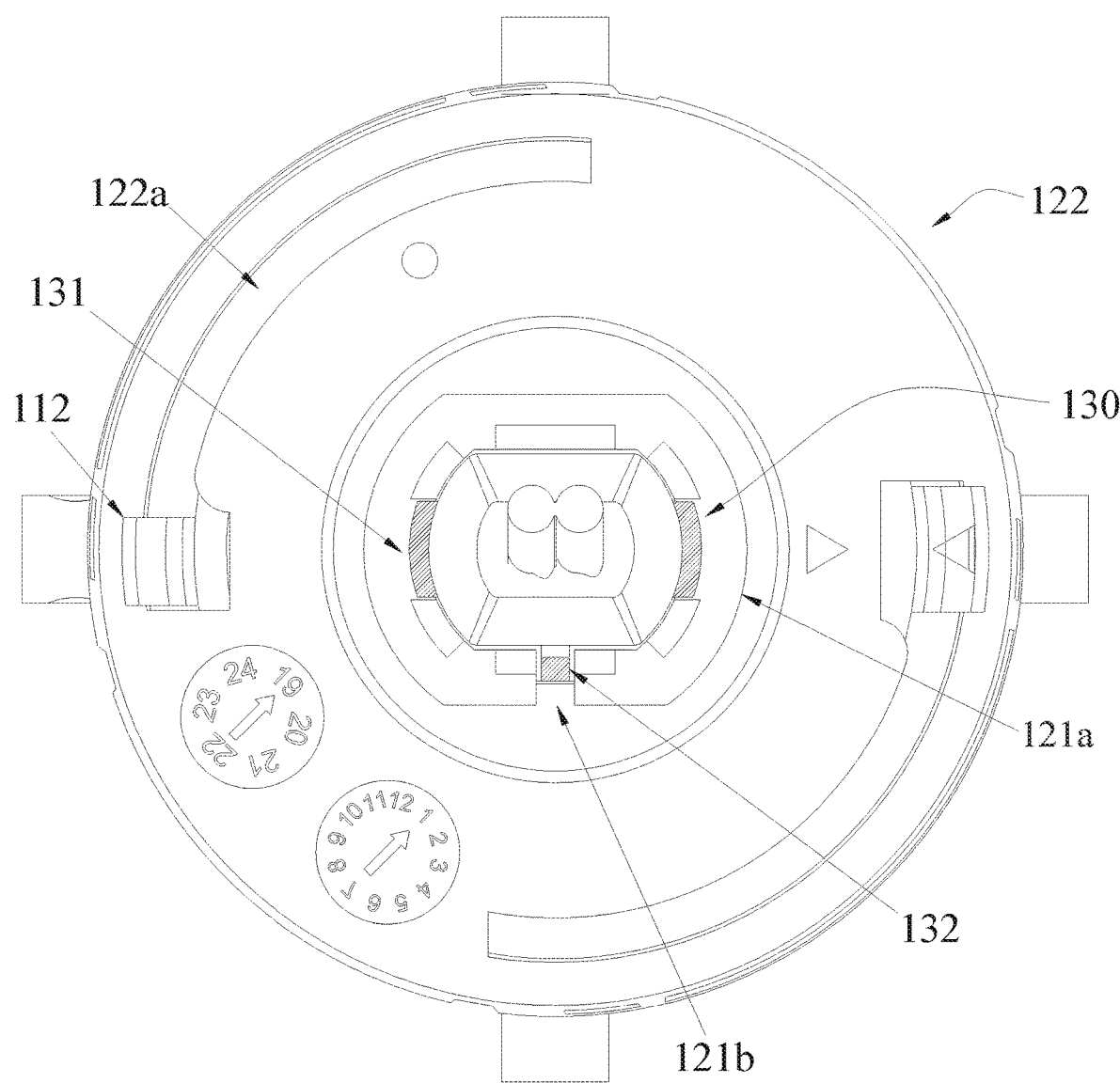
FIG. 7 is a structural schematic view of the fixing base shown in FIG. 2 from another perspective.

As shown in FIGS. 6 and 7, the fixing base 100 further comprises a wire base 130, which is provided with a clamping groove 131 having an embedded portion 132. It should be noted that the wire base 130 is configured to fix the connecting wire, the clamping groove 131 is configured to clamp the connector 121, and the embedded portion 132 is configured to fix the wire base on the connector.

As shown in FIG. 6, the connector 121 is provided with a snap ring 121a, which is provided with an embedment opening 121b; the wire base 130 is sleeved together with the connector 121, the snap ring 121a is clamped into the clamping groove 131, and the embedded portion 132 is embedded in the embedment opening 121b. It should be noted that the snap ring 121a is configured to be clamped into the clamping groove, and the embedment opening 121b is configured to install the embedded portion 132. In this way, by clamping the snap ring 121a into the clamping groove 131 and the embedded portion 132 into the embedment opening 121b, the fixing effect on the wire base and then the structural stability can be improved.

Figure 8:
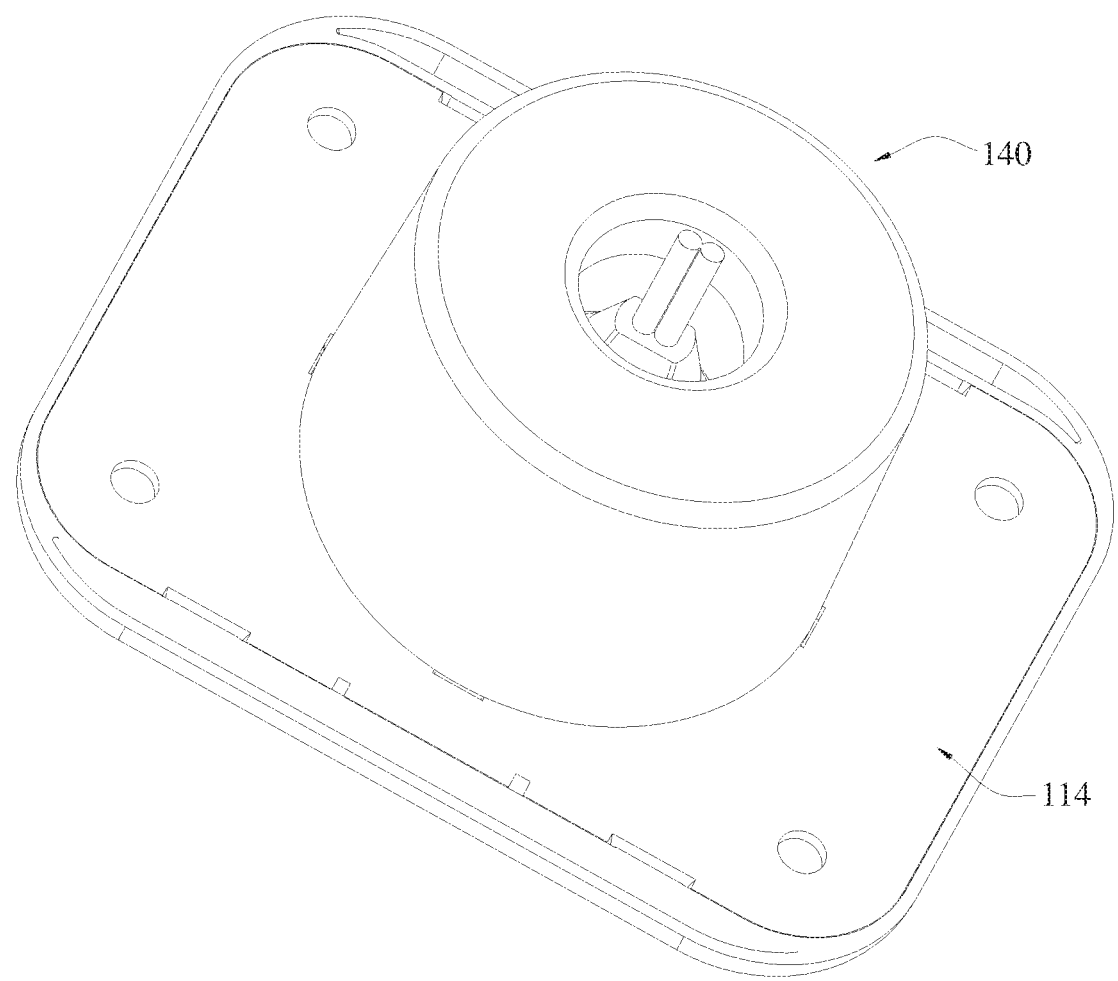
FIG. 8 is a structural schematic view of the fixing base shown in FIG. 2 from yet another perspective.

As shown in FIGS. 3 and 8, the mounting member 110 further comprises a mounting plate 114 connected to the sleeve 111, and the fixing base 100 further comprises a protective cover 140 clamped or screwed on the mounting plate 114. It should be noted that the protective cover 140 is configured to protect the rotating member and the mounting member, so as to prevent external cotton wool from entering the fixing base, improve the structural stability of the fixing base, ensure the effective rotation of the rotating member, and thus improve the service life.

Further, when the protective cover 140 is clamped on the mounting plate 114, a buckling portion may be provided on the protective cover, and a buckling groove may be provided on the mounting plate 114, with the buckling portion embedded in the buckling groove, so that the buckling effect can be achieved, and installation and assembly can be facilitated through the buckling structure. When the protective cover 140 is screwed to the mounting plate 114, an internal thread can be provided on the inner side wall of the protective cover, and an external thread protrusion can be provided on the mounting plate, so that the internal thread of the protective cover can mesh with the external thread protrusion on the mounting plate, thus facilitating the installation and assembly of the protective cover and improving the assembly efficiency.

Figure 9:
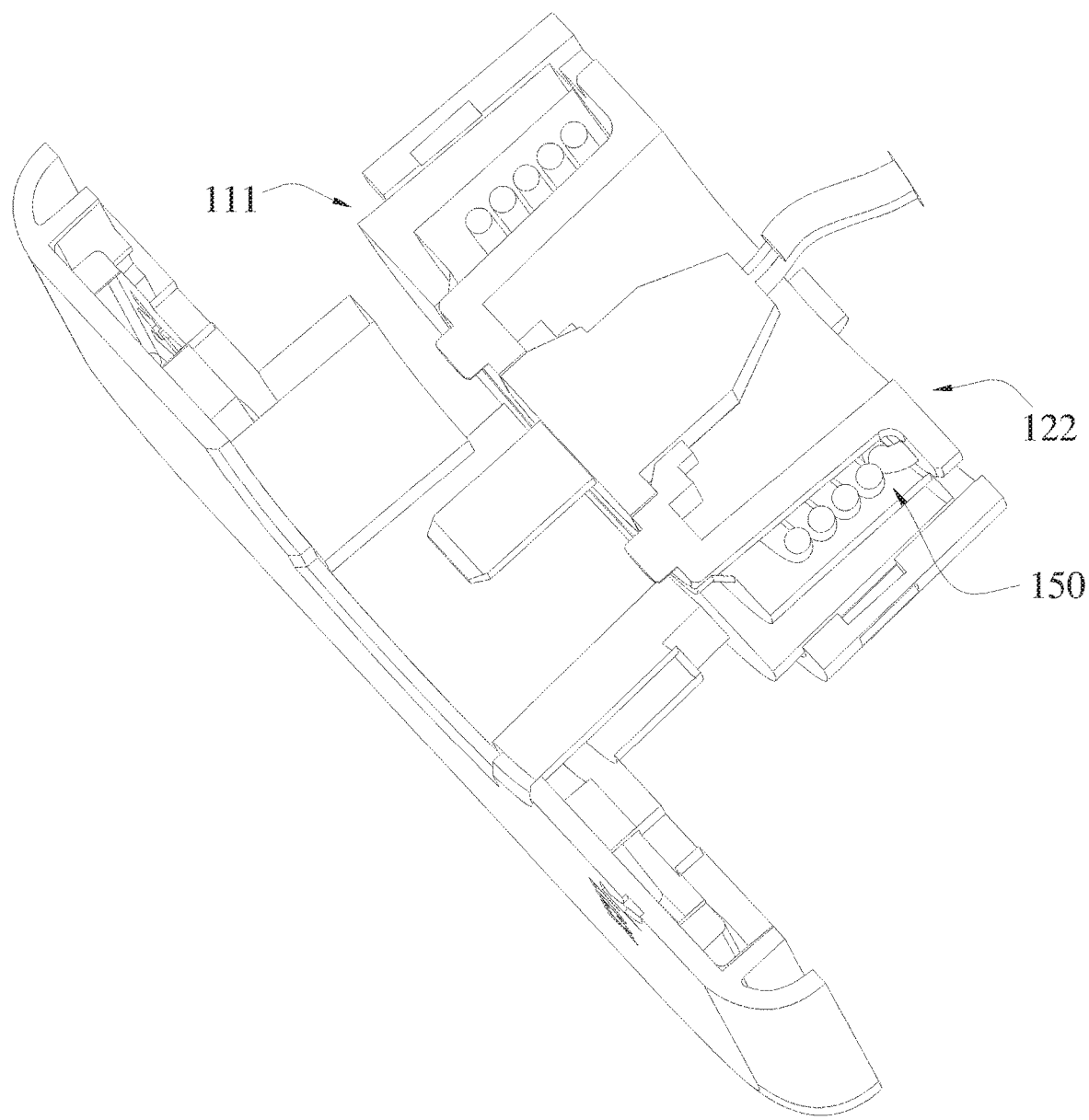
FIG. 9 is a schematic view of the inner structure of the fixing base shown in FIG. 2 from another perspective.

As shown in FIG. 9, the fixing base 100 further comprises a reset elastic member 150, which is respectively connected to the sleeve 111 and the rotary cap 122. Specifically, the reset elastic member 150, being a torsion spring, is sleeved on the sleeve 111 and located between the sleeve 111 and the rotary cap 122, with one end mounted on the rotary cap 122 and the other end mounted on the side wall of the sleeve 111. In this way, it can be ensured that the rotary cap has a reset function, and will not be in a half-open state but only in the initial position or in the fully-screwed position; that is, the rotation of the rotary cap must be within one of the bayonets, thereby preventing the power supply device from being incorrectly or reversely inserted, and improving the safety of the mounting member and rotating member.

It should also be noted that the reset elastic member 150, being a spring, is disposed between the sleeve 111 and the rotary cap 122, with the fixed end provided on the rotary cap and the reset end fixed on the sleeve. In this way, by providing a spring structure, the reset function of the rotary cap can also be realized, preventing the rotary cap from rotating halfway and improving the structural safety.

Figure 10:
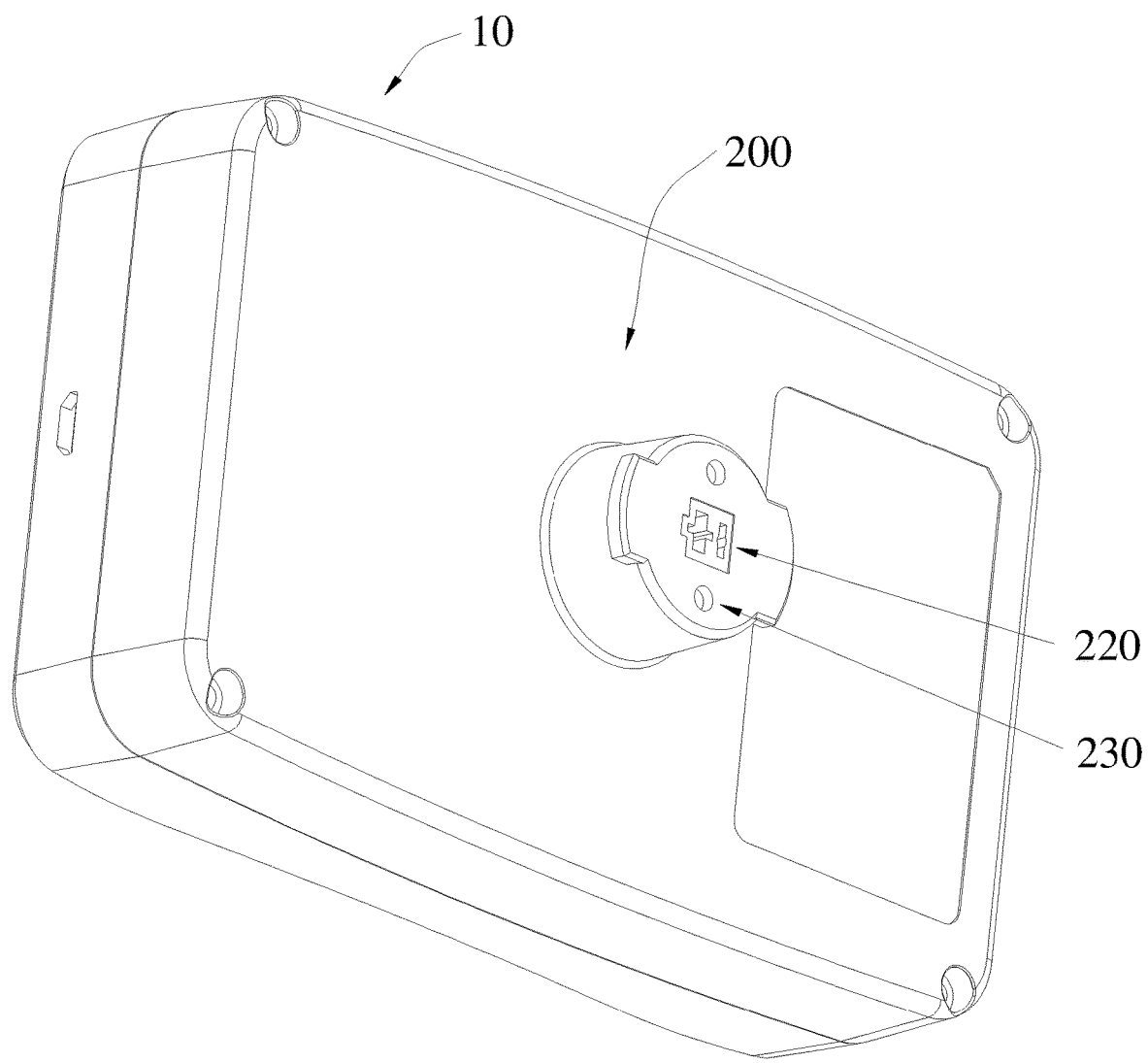
FIG. 10 is a structural schematic view of the rotary coupling plug of the rotary coupling structure shown in FIG. 1.

As shown in FIGS. 1 and 10, the rotary coupling plug 200, configured to be inserted into the sleeve 111 and connected with a connector 121, is provided with a rotary lock blade 210 rotatively disposed in the lock slot 111a. It should be noted that the rotary lock blade 210 is configured to lock the rotary coupling plug in the lock slot 111a, so that the entire rotary coupling plug can be fixed.

Figure 11:
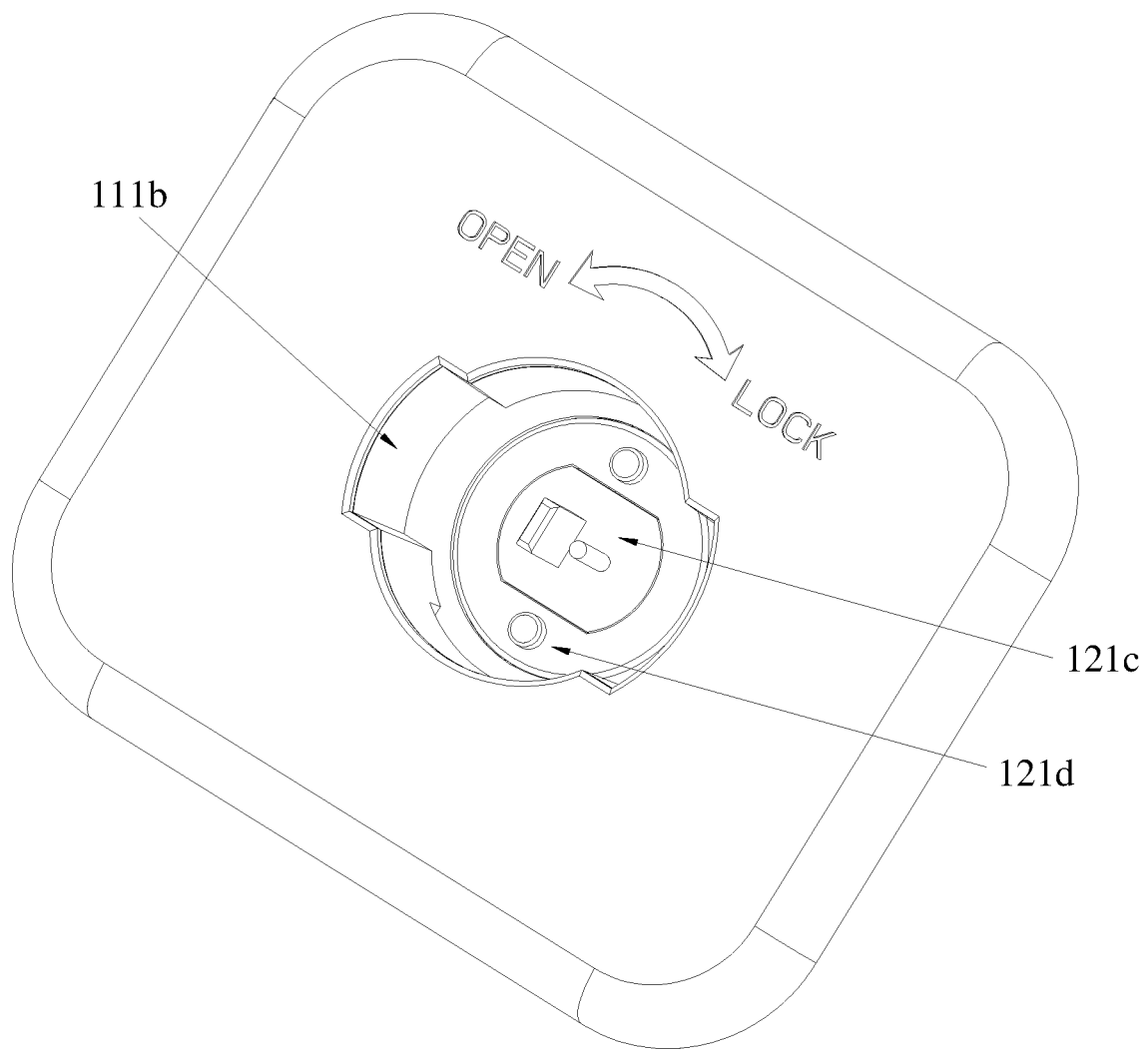
FIG. 11 is a structural schematic view of the connector of the fixing base shown in FIG. 1.

In this way, in the entire operation, the rotary coupling plug 200 is directly inserted into the sleeve 111 and then entirely rotated, so that the rotary lock blade 210 is embedded in the lock slot 111a to fix the rotary coupling plug 200, i.e., the rotary coupling plug 200 is mounted on the fixing base 100; this, on the one hand, can firmly install the power supply device in the power input interface of electric products so as to improve the stability of the mutual electrical connection and, on the other hand, can facilitate disassembly, installation and assembly and improve production efficiency. In one of the examples, as shown in FIGS. 10 and 11, the rotary coupling plug 200 is provided with a slot 220, and the connector 121 is provided with a pin 121c, which is configured to be inserted into the slot 220 so that the rotary coupling plug 200 is electrically connected to the connector. It should be noted that the slot 220 is configured for the insertion of the pin 121c, so that the electrical connection between the power supply device and the electric product can be achieved.

In another example, the connector is provided with a slot, and the rotary coupling plug 200 is provided with a pin, which is configured to be inserted into the slot so that the rotary coupling plug 200 is electrically connected to the connector. Specifically, since the rotary coupling plug and the connector are separate products, the positions of the slot and the pin are not limited here; that is, the positions of the slot and pin are set according to actual needs; in order to facilitate plugging and installing, in this example, the slot is set on the rotary coupling plug and the pin on the connector.

As shown in FIG. 11, the pin comprises at least two profiled pins; it should be noted that the profiled pins comprise large and small PIN pins, and are a square pillar pin and/or a cylindrical pin. Specifically, in this example, the large PIN pin is set as a flat square pin, and the small PIN pin is set as a cylindrical pin. In actual products, the shape and size of the pins, not defined here, can be changed according to the field of use of the electric product, as long as the electrical connection between the power supply device and the electric product can be achieved. Further, by setting two PIN pins of different sizes, the rotary coupling plug can be inserted according to a certain direction and angle, thus achieving the foolproof effect of the insertion and improving the safety of the product.

Again as shown in FIGS. 10 and 11, in one example, the rotary coupling plug 200 is provided with a slot 230, and the connector 121 is provided with a pillar 121d, which is configured to be embedded in the slot 230. It should be noted that, in order to achieve the foolproof and anti-reverse connection effects and also ensure that the rotary coupling plug can drive the rotating member to rotate after inserted, the rotary coupling plug 200 is provided with the slot 230, and the connector 121 is provided with the pillar 121d matching the slot 230, so that the foolproof and anti-reverse connection effects can be achieved when the rotary coupling plug is inserted, and then the inserted rotary coupling plug can be rotated to drive the connector to rotate, i.e., to drive the rotating member to rotate, with the entire operation simple, convenient and fast, improving the efficiency of installation and assembly. Besides, when the rotary coupling plug is to be disassembled, it is reversely rotated and then removed from the sleeve and the connector, which is also easy to operate.

In another example, the connector is provided with a slot, and the rotary coupling plug 200 is provided with a pillar, which is configured to be embedded in the slot. In this application, the positions of the slot and the pillar are not limited, and can be set according to actual needs, mainly to ensure that the rotary coupling plug can cooperate with the connector to drive the rotating member to rotate.

It should be noted that there are a plurality of the rotary lock blades 210 and a plurality of the lock slots 111*a*, the rotary lock blades 210 rotatively arranged in the lock slots 111*a* in a one-to-one correspondence. In this way, with the plurality of the rotary lock blades 210 respectively inserted into the corresponding lock slots 111*a*, the inserted rotary coupling plug can be fixed on the fixing base, and the foolproof function can also be achieved during insertion; that is, it is ensured that the rotary coupling plug is inserted at a certain angle and direction without the problem of wrong or incorrect insertion. In this example, there are two rotary lock blades 210 and two lock slots 111*a*, with the two rotary lock blades 210 respectively symmetrically disposed on the connector, thereby effectively achieving the anti-reverse connection and foolproof effects.

Further, in the entire rotary coupling structure, the anti-reverse connection and foolproof functions are provided in multiple places; that is, multiple foolproof structures are provided for the insertion of the rotary coupling plug, e.g., the rotary lock blade provided on the rotary coupling plug and a slide-in slot provided on the sleeve. The rotary coupling plug 200 is provided with a slot 230, and the connector 121 is provided with a pillar 121*d* matching the slot 230; besides, two profiled pins and PIN pins of different sizes and structures are also provided, which can also achieve the foolproof function; by setting a trinity foolproof structure, the direction and angle of insertion can be further limited to ensure that the user will not wrongly insert the rotary coupling plug, improving the structural safety and facilitating the installation and disassembly.

It should be noted that the rotary lock blades 210 are specifically a plurality of profiled rotary lock blades. The profiled rotary lock blades can be set to have a corresponding shape according to actual requirements, and a plurality of the profiled rotary lock blades can be set to have a symmetrical structure, such as a plum blossom structure, a two-way flange structure, or a square sheet; the actual shape of the rotary lock blade is acceptable, as long as the rotary lock blade is ensured to be snap-fitted with the mounting member and realize the foolproof function after it is inserted into the sleeve.

As shown in FIGS. 3 and 11, the sleeve 111 is further provided on the inner wall with a slide-in slot 111*b*, which is in communication with the lock slot 111*a*; and the rotary lock blade 210 is configured to slide along the slide-in slot 111*b*, so that the rotary lock blade 210 slides into the lock slot 111*a*. It should be noted that the slide-in slot 111*b* is configured to facilitate the insertion of the rotary lock blade 210, and is also in communication with the lock slot 111*a*, so that the rotary lock blade 210, after entering the sleeve from the slide-in slot 111*b*, can slide into the lock slot 111*a* along the bottom of the slide-in slot 111*b*, so as to lock and fix the rotary lock blade 210 and the sleeve 111 to facilitate installation and fixation.

It should be noted that one end of the arc slot 122*a* is aligned with one of the bayonets 122*c*, and the other end of the arc slot 122*a* is aligned with the other bayonet 122*c*. Specifically, the two bayonets are respectively arranged on both sides of the rotation slot and respectively aligned with the starting end and the terminal end of the arc slot, so that it is ensured that in the process of rotation the side boss 113 cannot rotate after it has entered the bayonet, thus preventing damage of the entire fixing base due to excessive rotation. That is, since the limit buckle 112 goes through the arc slot 122*a*, the rotation force that the limit buckle 112 can withstand during the rotation process is far greater than the force that the sidewall of the bayonet can bear. Specifically, it is conceivable that if the limit buckle 112 is not provided in the arc slot 122*a*, the side boss 113, during the rotation process, will rotate under the rotation force and can quickly slide over the deformation portion 123 to enter the bayonet. Similarly, if the side boss 113 does not stop rotating, it will press the inner side wall of the bayonet like it presses the deformation portion 123, and then the inner side wall of the bayonet will be deformed to a certain extent, and finally the side boss 113 may slide over the inner side wall of the bayonet, causing excessive rotation. It is just because the limit buckle 112 is provided in the arc slot 122*a* that the limit effect can be greater during rotation, much greater than when only the bayonet is available, thereby preventing excessive rotation and improving the safety and reliability of the structure.

As shown in FIGS. 1 and 10, the present invention further provides a power supply device, which comprises the rotary coupling structure according to any of the above, and further comprises a battery pack 10 connected to the rotary coupling plug 200. The power supply device herein may also have other structures, as long as it can be ensured to supply power to the electric product. The present invention further provides a sofa, which comprises the power supply device as described above, and further comprises a sofa body, on which a fixing base 100 is installed, the rotary coupling plug 200 connected with the battery pack 10 being configured to be inserted into the fixing base 100.

The present invention has the following advantages and beneficial effects compared to the prior art:

The present invention provides a rotary coupling structure, a power supply device and a sofa, and makes the rotary coupling plug in the rotary coupling structure rotatively disposed on the fixing base; in this way, the present invention can firmly install the power supply device in the power input interface of electric products, so as to improve the stability of the mutual electrical connection on the one hand, and can facilitate disassembly, installation and assembly and improve production efficiency on the other hand.

The above embodiments only show several embodiments of the present invention, and are described specifically and in detail; however, they cannot be construed as limiting the scope of the present invention. It should be noted that, for those of ordinary skill in the art, several modifications and improvements could be made without departing from the concept of the present invention, all within the protection scope of the present invention. Therefore, the protection scope of the present invention shall be subject to the appended claims.

We claim:

1. A rotary coupling structure, characterized in that: it comprises:

a fixing base including a mounting member and a rotating member; the mounting member comprises a sleeve provided on the inner wall with a lock slot, a limit buckle disposed at the end of the sleeve, and a side boss disposed on the side wall of the sleeve; the rotating member comprises a rotary cap and a connector disposed in the rotary cap; the rotary cap, sleeved together with the sleeve, has an arc slot at its end and a rotation slot on its side wall, and is provided with a bayonet at both ends of the rotation slot, respectively; the limit buckle is rotatively disposed in the arc slot; the side boss, rotatively disposed in the rotation slot, can also be locked in the bayonet; and a rotary coupling plug, configured to be inserted into the sleeve and connected with the connector, is provided with a rotary lock blade rotatively disposed in the lock slot.

2. The rotary coupling structure according to claim 1, characterized in that: the rotary coupling plug is provided with a slot, and the connector is provided with a pin, which is configured to be inserted into the slot so that the rotary coupling plug is electrically connected to the connector; or
   the connector is provided with a slot, and the rotary coupling plug is provided with a pin, which is configured to be inserted into the slot so that the rotary coupling plug is electrically connected to the connector.

3. The rotary coupling structure according to claim 2, characterized in that: the pin comprises at least two profiled pins; and
   the profiled pins are a square pillar pin and/or a cylindrical pin.

4. The rotary coupling structure according to claim 1, characterized in that: the connector is provided with a slot, and the rotary coupling plug is provided with a pillar, which is configured to be embedded in the slot; or
   the rotary coupling plug is provided with a slot, and the connector is provided with a pillar, which is configured to be embedded in the slot.

5. The rotary coupling structure according to claim 1, characterized in that: there are a plurality of the rotary lock blades and a plurality of the lock slots, the rotary lock blades rotatively arranged in the lock slots in a one-to-one correspondence.

6. The rotary coupling structure according to claim 5, characterized in that: the rotary lock blades are specifically a plurality of profiled rotary lock blades.

7. The rotary coupling structure according to claim 1, characterized in that: the sleeve is also provided on the inner wall with a slide-in slot, which is in communication with the lock slot, with the rotary lock blade configured to slide along the slide-in slot into the lock slot.

8. The rotary coupling structure according to claim 1, characterized in that: one end of the arc slot is aligned with one of the bayonets, and the other end of the arc slot is aligned with the other bayonet.

9. A power supply device, characterized in that: it comprises the rotary coupling structure according to claim 1, and further comprises a battery pack connected to the rotary coupling plug.

10. A sofa, characterized in that: it comprises the power supply device according to claim 9, and further comprises a sofa body, on which the fixing base is installed, the rotary coupling plug connected with the battery pack being configured to be inserted into the fixing base.

* * * * *